(12) United States Patent
Tadayon et al.

(10) Patent No.: US 6,877,318 B2
(45) Date of Patent: *Apr. 12, 2005

(54) ELECTRICAL ENERGY-GENERATING HEAT SINK SYSTEM AND METHOD OF USING SAME TO RECHARGE AN ENERGY STORAGE DEVICE

(75) Inventors: Pooya Tadayon, Hillsboro, OR (US); Franklin G. Monzon, Temple City, CA (US); Prateek Dujari, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/458,570

(22) Filed: Jun. 9, 2003

(65) Prior Publication Data

US 2003/0192314 A1 Oct. 16, 2003

Related U.S. Application Data

(63) Continuation of application No. 09/991,110, filed on Nov. 16, 2001, now Pat. No. 6,574,963.

(51) Int. Cl.[7] .............................................. F01K 25/08
(52) U.S. Cl. ........................................ 60/651; 60/671
(58) Field of Search .......................... 60/645, 651, 670, 60/671, 618

(56) References Cited

U.S. PATENT DOCUMENTS

| | | | |
|---|---|---|---|
| 4,069,672 A | 1/1978 | Milling | 60/618 |
| 4,869,250 A | 9/1989 | Bitterly | 128/400 |
| 5,176,000 A | 1/1993 | Dauksis | 60/618 |
| 5,319,938 A | 6/1994 | Lucas | 62/6 |
| 5,331,510 A | 7/1994 | Ouchi et al. | 361/702 |
| 5,343,358 A | 8/1994 | Hilbrink | 361/700 |
| 5,357,757 A | 10/1994 | Lucas | 62/6 |
| 5,435,152 A | 7/1995 | McCausland | 62/467 |
| 5,491,981 A | 2/1996 | Kim | 62/324.6 |
| 5,515,684 A | 5/1996 | Lucas et al. | 62/6 |
| 5,549,155 A | 8/1996 | Meyer, IV et al. | 165/104.33 |
| 5,579,399 A | 11/1996 | Lucas | 381/165 |
| 5,582,242 A | 12/1996 | Hamburgen et al. | 165/104.21 |
| 5,864,478 A | 1/1999 | McCutchan et al. | 363/147 |
| 5,875,095 A | 2/1999 | Webb | 361/700 |
| 5,880,524 A | 3/1999 | Xie | 257/704 |
| 5,892,293 A | 4/1999 | Lucas | 290/1 R |
| 5,955,797 A | 9/1999 | Kim | 307/150 |
| 5,982,297 A | 11/1999 | Welle | 340/870.16 |
| 5,994,854 A | 11/1999 | Lawrenson et al. | 318/114 |
| 6,021,044 A | 2/2000 | Neville, Jr. et al. | 361/700 |
| 6,052,285 A | 4/2000 | Hileman | 361/699 |
| 6,082,443 A | 7/2000 | Yamamoto et al. | 165/104.26 |
| 6,111,750 A | 8/2000 | Gates | 361/700 |

(Continued)

OTHER PUBLICATIONS

*Thermacore International, Inc.*, http://www.thermacore.com,8 p.

Epstein, A. H., "Micro Turbine Engines for Soldier Power", *Presented at the Defense Science and Technology Seminar—Future Warrior Systems*, (Oct. 2000), 17 p.

(Continued)

*Primary Examiner*—Hoang Nguyen
(74) *Attorney, Agent, or Firm*—Schwegman, Lundberg, Woessner & Kluth, P.A.

(57) ABSTRACT

An electrical energy-generating heat sink system is described herein that provides a convenient and economical method for continuously recharging an energy storage device in electronic devices.

35 Claims, 8 Drawing Sheets

U.S. PATENT DOCUMENTS

| | | | |
|---|---|---|---|
| 6,119,474 A | 9/2000 | Augustine et al. | 62/259.3 |
| 6,125,035 A | 9/2000 | Hood, III et al. | 361/687 |
| 6,133,631 A | 10/2000 | Belady | 257/714 |
| 6,163,073 A | 12/2000 | Patel | 257/712 |
| 6,178,088 B1 | 1/2001 | Gates | 361/699 |
| 6,197,257 B1 | 3/2001 | Raskas | 422/82.05 |
| 6,226,178 B1 | 5/2001 | Broder et al. | 361/687 |
| 6,227,287 B1 | 5/2001 | Tanaka et al. | 165/80.4 |
| 6,263,959 B1 | 7/2001 | Ikeda et al. | 165/104.26 |
| 6,317,322 B1 | 11/2001 | Ueki et al. | 361/700 |
| 6,324,592 B1 | 11/2001 | Hindman | 710/3 |
| 6,328,097 B1 | 12/2001 | Bookhardt et al. | 165/104.33 |
| 6,349,035 B1 | 2/2002 | Koenen | 361/719 |
| 6,574,963 B1 * | 6/2003 | Tadayon et al. | 60/651 |

OTHER PUBLICATIONS

Epstein, A. H. et al., "ShirtButton–Sized Gas Turbines: The Engineering Challenges of Micro High Speed Rotating Machinery", *Presented at the 8th International Symposium on Transport Phenomena and Dynamics of Rotating Machinery (ISROMAC–8)*, Honolulu, HI, (Mar. 2000), 11 p.

Epstein, A., et al., "Turbomachinery", http://web.mit.edu/aeroastro/www/labs/GTL/research/micro/turbo.html, 1 p.

Mehl, D., "Vapor Chamber Heat Sinks Eliminate Hot Spots", *Thermacore, Inc.*, www.thermacore.com, 4 p.

* cited by examiner

ELECTRICAL ENERGY-GENERATING HEAT SINK SYSTEM AND METHOD OF USING SAME TO RECHARGE AN ENERGY STORAGE DEVICE

This application is a continuation of U.S. patent application Ser. No. 09/991,110, filed Nov. 16, 2001, now issued as U.S. Pat. No. 6,574,693, which is incorporated herein by reference.

CROSS REFERENCES

This application is related to the following U.S. patent applications which are assigned to the same Assignee as the present application:

U.S. patent application Ser. No. 09/583,802, filed on May 31, 2000, now issued as U.S. Pat. No. 6,367,263, entitled "Integrated Circuit Refrigeration Device;" and U.S. patent application Ser. No. 09/746,554, filed on Dec. 22, 2000, now issued as U.S. Pat. No. 6,639,799, entitled "An Integrated Vapor Chamber Heat Sink and Spreader and an Embedded Direct Heat Pipe Attachment."

TECHNICAL FIELD

This invention relates generally to heat sink systems, and in particular, the present invention relates to an electrical energy-generating heat sink system.

BACKGROUND

Electronic devices in use today are requiring ever-increasing amounts of power. Portable energy sources in such devices provide only limited use until the unit is recharged or the energy source is replaced. Typically, recharging can only be performed when the device is not being used (e.g., by placing the energy source or the entire device in a recharging unit) or otherwise requires a hook-up to the power grid or other external energy source, e.g., automobile cigarette lighter.

In the mobile computing environment, one of the primary challenges has been to extend battery life to enable consumers to prolong the use of the device while mobile. In the past, this challenge has typically been met by building low power processors where power consumption is minimized through circuit design and/or power throttling features. However, persistent consumer demand for higher performance renders this approach impractical. For example, recently developed mobile applications use processors requiring 30 watts or more of power to be drawn off over a temperature of about 100° C. Other efforts have focused on extending battery life, although results, to date, have been incremental at best.

For the reasons stated above, there is a need in the art for a simple, yet effective means for extending the life of portable energy sources.

DETAILED DESCRIPTION

Figure 1:
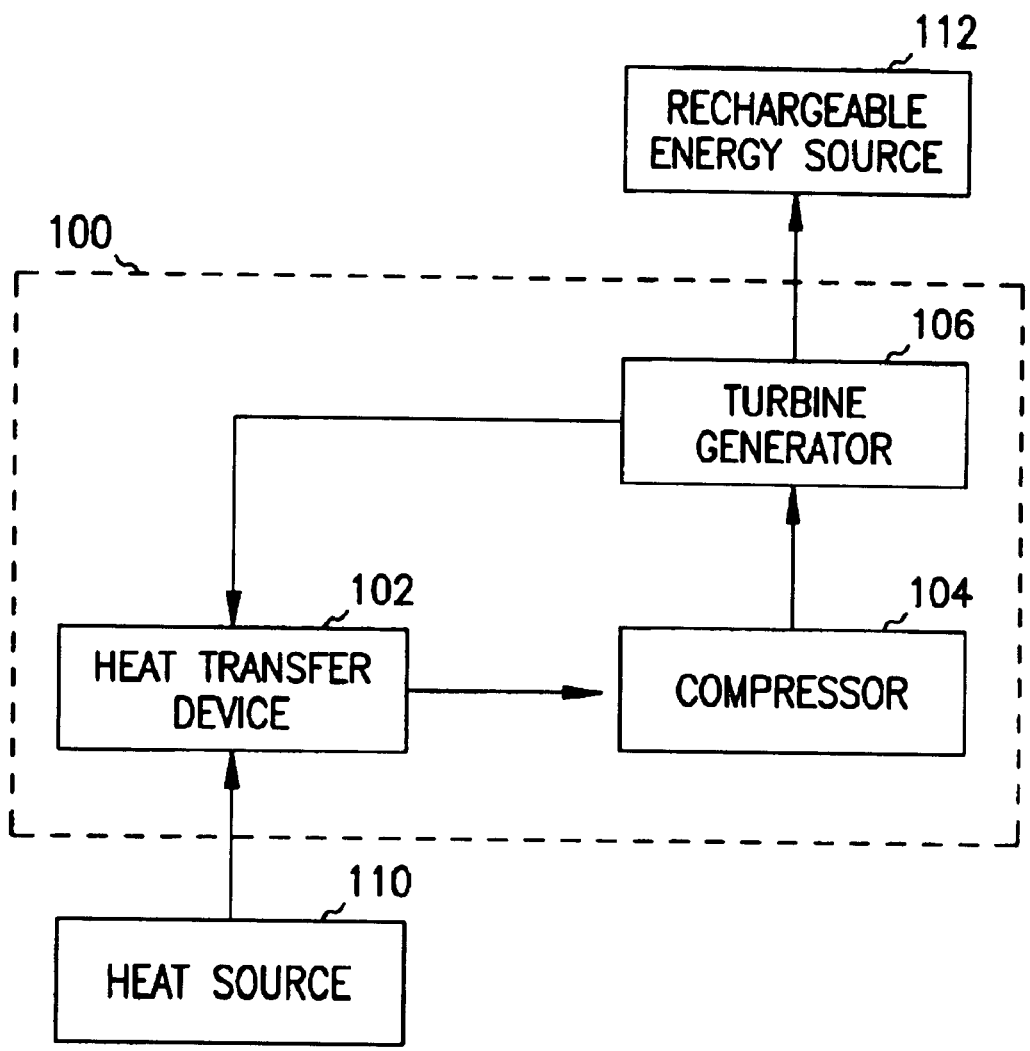
FIG. 1 is a block diagram describing an electrical energy-generating heat sink system in one embodiment of the present invention.

In the following detailed description, reference is made to the accompanying drawings which form a part hereof, and in which is shown by way of illustration specific embodiments in which the inventions may be practiced. In the drawings, like numerals describe substantially similar components throughout the several views. These embodiments are described in sufficient detail to enable those skilled in the art to practice the invention. Other embodiments may be utilized and structural, logical, electrical, and other changes may be made without departing from the spirit and scope of the present invention. The following detailed description is, therefore, not to be taken in a limiting sense, and the scope of the present invention is defined only by the appended claims, along with the full scope of equivalents to which such claims are entitled.

Definitions

As used herein, the term "working fluid" refers to a multi-phase liquid that can change between a liquid and a vapor at the operating temperatures and pressures of the system it is being used in.

As used herein, the term "heat pipe" refers to a heat transfer device. Heat pipes transfer heat by the evaporation and condensation of a working fluid. A heat pipe is a vacuum tight vessel which is evacuated and partially back-filled with the working fluid. As heat is input to the heat pipe, the fluid is vaporized, creating a pressure gradient within the heat pipe, which forces the vapor to flow. This heated portion is often referred to as the "evaporator portion." In a conventional heat pipe, this flow consists of all the vaporized fluid moving towards the cooler portion of the pipe, i.e., the condenser portion, where it condenses, giving up its latent heat of vaporization. The working fluid is then returned to the evaporator portion. In most instances, this is accomplished with some type of "pump," such as with a mechanical condenser, capillary forces developed in a wick structure, and so forth. Such a pump is needed as a heat pipe is considered by many to include only devices oriented to work against gravity. (Common usage of the term "heat pipe," however, sometimes includes reference to devices that have no wick structure, such as thermosyphons defined below). A heat pipe can be bent and formed into any number of configurations and is considered to include any type of "vapor spreader" such as a "vapor chamber."

As used herein, the term "vapor chamber heat sink" refers to a vapor chamber in combination with cooling fins, rods and so forth. The vapor chamber base portion of a typical vapor chamber heat sink typically consists of an evaporator, an adiabatic section and a condenser. It is the evaporator or evaporator portion that is placed in contact with the heat-generating device. The vapor chamber in a vapor chamber heat sink may further include a type of pumping means, such as a wick, to provide a return path from the condenser to the evaporator.

As used herein, the term "thermosyphon" refers to a heat transfer device that is gravity aided, having no additional pumping means. A thermosyphon, therefore, technically includes a vapor chamber having no wick structure, although such a chamber is often referred to as a type of heat pipe. Such a vapor chamber is necessarily oriented with the condenser portion located above the evaporator portion.

As used herein, the term "thermal solution" refers to a heat transfer device commonly used to cool a central processing unit (CPU). The term "thermal solution" is sometimes used interchangeably with the term "heat sink," which can include a fan (sometimes referred to as a "fansink").

As used herein, the term "battery" refers to an electrochemical energy storage device or direct-current voltage source that converts chemical, thermal, nuclear or solar energy into electric energy. A battery stores electrical energy using electrochemical cells. Chemical reactions occur spontaneously at the electrodes when connected through an external circuit, producing an electrical current. The physical construction of a battery is such that it does not permit the intermixing and consequent direct reaction of the chemicals stored in it. Although a battery typically consists of several cells coupled in series or parallel, or any combination thereof, a single cell is commonly referred to as a battery.

As used herein, a "rechargeable battery" refers to a battery in which the chemical reaction system providing the electrical current is chemically reversible. After discharging, a rechargeable battery can be recharged by applying an electrical current to its terminals. A rechargeable battery is also referred to as a secondary battery, accumulator battery, storage battery, and so forth. Rechargeable batteries typically used in portable computing devices, such as notebook computers include nickel cadmium, nickel metal hydride and lithium ion batteries.

As used herein, the term "battery charger" refers to a device that provides electrical energy to a rechargeable battery, causing it to recharge. Again, common usage often refers to a battery charger as applying "power" to charge a battery, although this technically refers to the "rate" at which the electrical energy can be supplied. Usually the voltage and current are controlled so the battery is charged rapidly, but without undue stress.

As used herein, the term "charging" refers to a process for "filling" a rechargeable battery with electricity by applying a current to its terminals. The process will cause electrochemical reactions to occur in the battery, storing the electricity in chemical form. (In contrast, during the charging of a capacitor the electricity is stored as electrical charges, without causing any chemical reactions to occur).

As used herein, the term "electrical source" refers to a type of energy source, i.e., a source of electrical current. It can be electrochemical (battery or fuel cell) or an electromechanical device (dynamo) or a specialized electronic instrument. Specialized sources can be called a "voltage source" or a "current source," indicating the characteristic of the electrical power that can be controlled by that device.

As used herein, the term "electrical energy" refers to the ability of an electrical source to carry out useful work or generate heat. For example, this energy can be used to drive an electrical motor and carry out mechanical work, or to generate heat with an electrical heater. Electrical energy is usually expressed in units of watt-hour (Wh).

As used herein, the term "electrical power" refers to the rate at which an electrical source can supply electrical energy. For example, a battery may be able to store a large amount of energy, but if it has a small power capability it can provide the energy (do some work) only slowly, and it will take a long time to discharge. Another battery with the same energy storage capability but larger power will provide the energy (do work) faster, but will also be discharged faster. Electrical power is expressed usually in units of watt (W). The terms "power" and "energy" are often used interchangeably, e.g., "energy source" is often equated with "power source" and such usage may occur herein, although it is to be appreciated that the context in which the term is used provides any necessary clarification. "Loads" are also characterized by a power rating, e.g., an electrical motor or a light bulb is characterized by the power needed to operate it.

As used herein, the term "energy efficiency" refers to a fraction, usually expressed as a percentage of electrical energy stored in a rechargeable battery that is recoverable during discharging. The percentage is dependent on several factors, including current efficiency, heat losses, and so forth.

As used herein, the term "turbine generator" refers to an electric generator that is driven by steam, gas, or hydraulic turbine coupled to it for electric power production. The term "generator" as used herein refers to a machine by which mechanical energy is changed into electrical energy through use of magnetic fields. If the electrical energy output by the generator is DC, the generator is referred to as a "DC generator." If the electrical energy that is output is an alternating current, the generator is referred to as an "alternator." All generators have a stationary stator and a rotating rotor. The rotating rotor is mounting on bearings so it can rotate, with a rotor shaft sticking out beyond the generator housing. Input to a generator is provided by a "prime mover" which, in this instance, is a "turbine" coupled to the rotor shaft of the generator in order to provide the requisite torque. The term "turbine" as used herein refers to a rotary engine actuated by the reaction or impulse or both of a current of fluid or vaporized fluid subject to pressure. A turbine is typically made with a series of vanes or blades on a central rotating spindle.

As used herein, the term "MEMS" refers to Micro-Electrical Mechanical Systems. MEMS are electrical machines built on silicone using lithography processes and standard silicon manufacturing processes. Examples include MEMS-based turbine engines, turbine-generators, condensers, compressors, and so forth.

Description of the Embodiments

An electrical energy-generating heat sink system is described herein that provides a convenient and economical method for continuously recharging an energy storage device in electronic devices. In one embodiment, the system includes a refrigeration system in combination with an electricity generating device. Working fluid in the refrigeration system is vaporized in a heat transfer device and then channeled through a vapor pressurizing device, such as a compressor, to produce pressurized vapor. The pressurized vapor then passes through the electricity generating device, such as a turbine generator, which provides electrical energy to the rechargeable energy storage device, such as a notebook battery. Excess vapor is reliquified in the heat transfer device for use again in the system.

FIG. 1 shows a simplified block diagram of an electrical energy-generating system 100. In one embodiment, the electrical energy-generating system 100 includes a heat transfer device 102, a compressor 104 and a turbine generator 106. A working fluid present in the heat transfer device 102 is converted to vapor by a heat source 110, such as a microprocessor. The vapor is then directed from the heat transfer device 102 to the compressor 104 where it is pressurized prior to its release into the turbine generator 106. The pressurized vapor causes the blades in the turbine portion of the turbine generator 106 to rotate, producing mechanical energy. This mechanical energy is converted to electrical energy in the generator portion of the turbine generator 106, which is provided to a rechargeable energy source 112, such as a battery. Excess vapor from the turbine generator 106 re-enters the heat transfer device 102, where it is reliquified by cooling for use again in the electrical energy-generating system 100.

Each component of the electrical energy-generating system 100 can be any suitable size and shape, as long as the system fits together properly to perform the intended function. In one embodiment, the electrical energy-generating system is designed to accommodate a range of sizes and types of electronic devices. In yet another embodiment, the electrical energy-generating system is custom designed for any type of unique application. In an exemplary embodiment, the electrical energy-generating system 100 can be used in a laptop computer and is between about five (5) and ten (10) mm thick.

Heat transfer device designs vary, and the present invention is not limited to any specific design, although space constraints in certain environments, such as the mobile environments, certainly influence the final design. In one embodiment, the heat transfer device comprises a straight hollow tube partially filled with a liquid with the air evacuated from the unfilled volume. The liquid and its vapor within the tube are in equilibrium at the partial pressure of the liquid. The main thermal transfer mechanism with this type of device is the storage and release of the latent heat of vaporization of the liquid. One end of the tube serves as an evaporator while the other end acts as a condenser. Heat applied to the evaporator boils the liquid, converting it to its vapor phase. The heat transferred is the latent heat of liquid vaporization. The vapor enters the condenser, where it condenses by releasing the latent heat of vaporization. The condensed liquid then returns to the evaporator where it is reliquified prior to transfer to the liquid reservoir for use again in the system. In most embodiments, the system operates at less than one (1) atmosphere of pressure. In such embodiments, it is important for air not to leak into the heat transfer device. Otherwise, the fluid would slowly vaporize as it reaches its atmospheric boiling point.

This type of heat transfer device does not have a set thermal conductivity due to the use of two-phase heat transfer. However, it is generally known that the effective thermal conductivity improves with an increase in certain dimensions. Unlike solid materials, the effective thermal conductivity in heat pipes and thermosyphons changes with the amount of energy being transferred as well as with the size of the evaporator and condenser portions of the heat transfer device.

Various types of commercial heat transfer devices are available, such as the heat pipes made by Thermacore,® Inc. in Lancaster, Pa. The heat transfer device 102 can further include separate condenser and evaporator sections that are thermally and/or fluidly coupled to each other via a pumping device, such as a wick. See, for example, U.S. patent application Ser. No. 09/583,802, filed on May 31, 2000, entitled "Integrated Circuit Refrigeration Device" (hereinafter "U.S. application Ser. No. 09/583,802").

The present invention operates by diverting the normal flow of vapor in a heat transfer device to a vapor pressurizing device and then into electricity producing components in order to produce electrical energy as described herein. Consequently, if commercial heat transfer devices are used, such as the Thermacore® heat pipes noted above, suitable modifications would need to be made.

In one embodiment, the heat transfer device 102 is a thermosyphon. In another embodiment, the heat transfer device 102 is a heat pipe. In a particular embodiment, the heat transfer device 102 is a vacuum chamber heat sink that can serve as a heat pipe or a thermosyphon. In such a device, the heat dissipating region typically includes heat dissipation elements such as fins or rods that provide large surface areas for spreading heat. The heat transfer device can be made from any suitable material. In one embodiment, the heat transfer device is made from copper or a copper-based material. The heat transfer device 102 can further include a fan, as is known in the art, which provides air movement to increase the amount of heat dissipated over time. The heat transfer device and/or each portion thereof is thermally and/or fluidly coupled to other components in the system.

It is appreciated that virtually any mechanism can be used to cool the excess vapor exiting the turbine blades. In one embodiment, a conventional condenser arrangement, as described herein, is used to reliquify the vapor. In another embodiment, a separate energy source, such as the type of energy provided by a thermoelectric cooler, is used. (A thermoelectric cooler is capable of providing heating or cooling, depending on the polarity of its voltage.)

Any suitable type of fluid known in the art can be used. This includes, but is not limited to methanol, ammonia and acetone. Although water, e.g., deionized water, also has excellent thermal properties and is known to adequately cool heat sinks, it may be less efficient with regard to its ability to provide highly-pressurized forces to the turbine blades due to its relatively low vapor pressure, i.e., less than one (1) atm at operating temperature. In another embodiment, low-boiling point dielectric fluids are used, i.e., fluids that boil at less than about 40° C. Examples include, but are not limited to, hydrofluoroethers (HFE), chlorofluorocarbons (CFC), and so forth. Although low-boiling fluids may not provide as much cooling for the heat sink as fluids having a relatively low vapor pressure, the higher vapor pressure from such fluids, i.e., in excess of about three (3) atm at operating temperature, allows the turbines to operate more efficiently. Specifically, since the turbine blades spin faster with the increased pressure or force, more electrical energy is produced per given volume of fluid. In yet another embodiment, high-boiling dielectrics are used. The optimum fluid will ultimately depend on a specific application. In other embodiments, liquid metals such as sodium and potassium are used. Generally, the amount of fluid used herein is quite small, e.g., less than one (1) mL to about ten (10) mL.

Other components in the system, such as the compressor 104 and turbine generator 106 can also take any form. In one embodiment, any suitable type of device is used that is capable of performing the intended function. In another embodiment one or more of the components are MEMS devices, as defined herein. Each of the components are coupled in any suitable manner. In one embodiment, the components are fluidly and/or thermally and/or electrically and/or mechanically coupled, as those terms are understood in the art. In another embodiment, the turbine generator is replaced by two separate components, namely a turbine and a generator coupled together in any suitable manner.

In one embodiment, the compressor is a turbine compressor, screw compressor or centrifugal compressor, although the invention is not so limited. In another embodiment, the compressor is an acoustic compressor as described in U.S. Pat. No. 5,319,938, issued Jun. 14, 1994 to Timothy Lucas and in U.S. application Ser. No. 09/583, 802, supra. It is appreciated that the compressor can be driven by any suitable means, such as with a piezoelectric device.

In one embodiment, the turbine or turbine portion of a turbine generator has high speed rotating blades, such as a micro radial inflow turbine. In another embodiment, the generator or generator portion of a turbine generator is a micro electrostatic starter generator.

It is understood that components integral to these devices, such as bearings, and so forth, need to be compatible with the micro device environment. In one embodiment, the bearings are electromagnetic, air, journal (e.g., cylindrical rotor, wave, foil, etc.), electric and so forth. Other design considerations include maintaining suitable Reynolds numbers, air pressure, shaft speed and so forth. Furthermore, the materials, including the electrical infrastructure used to conduct electricity from the turbine generator to the rechargeable energy storage device, will not be discussed in detail herein. Such design considerations are known to those skilled in the art.

For a discussion of MEMS technology, see, for example, A. H. Epstein, et al., *Shirtbutton-Sized Gas Turbines: The Engineering Challenges of Micro High Speed Rotating Machinery*, presented at the 8th Int'l Symposium on Transport Phenomena (hereinafter "Epstein") and Dynamics of Rotating Machinery (ISROMAC-8), Honolulu, Hi., March 2000 and A. H. Epstein, *Micro Turbine Engines for Soldier Power*, presented at "The Defense Science and Technology Seminar: Future Warrior Systems," October 2000.

Figure 2:
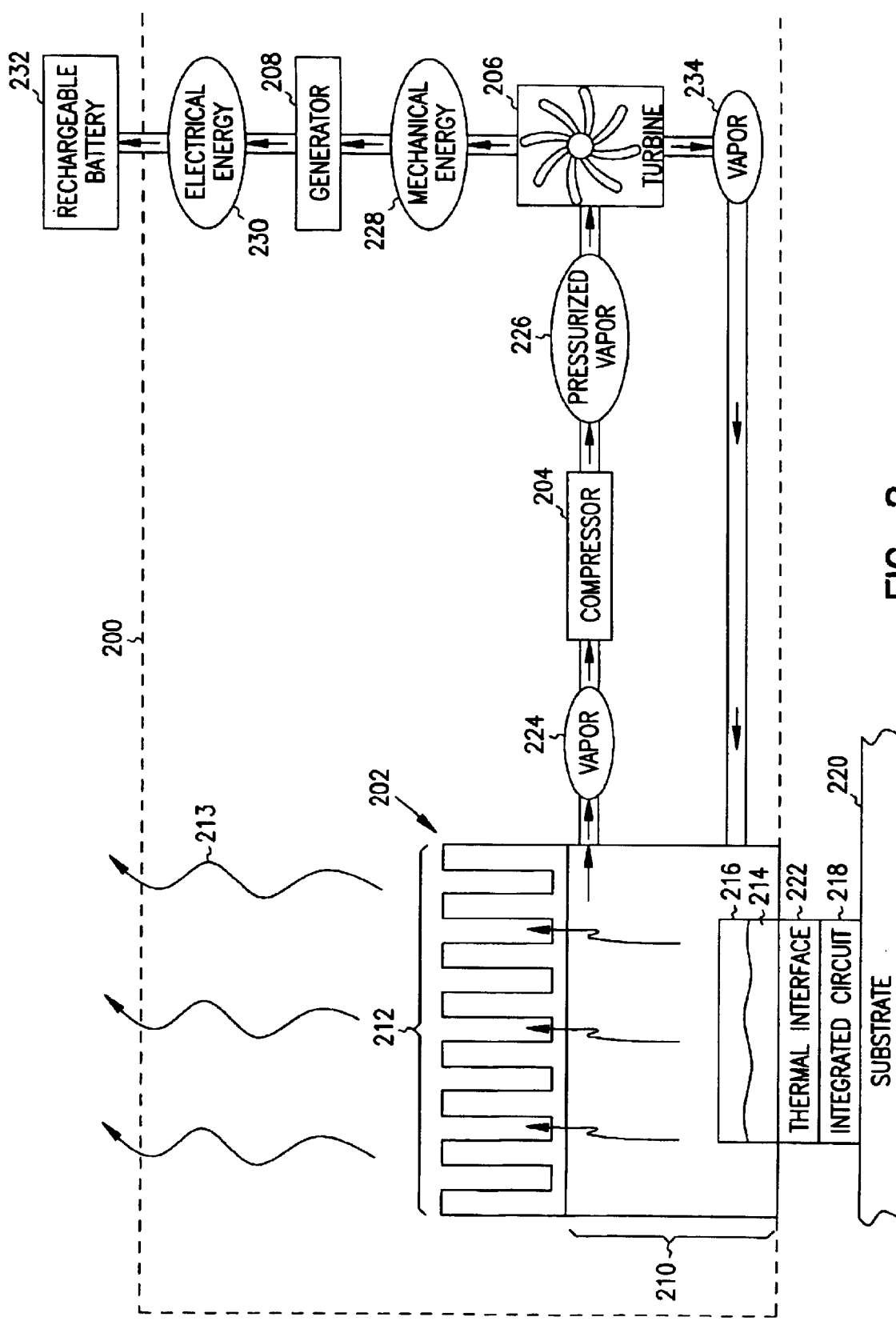
FIG. 2 is a simplified schematic of one embodiment of the electrical energy-generating heat sink system of FIG. 1.

FIG. 2 shows a simplified schematic of one embodiment of the present invention. The electrical energy-generating system 200 in this embodiment includes a vapor chamber heat sink 202, a MEMS compressor 204, a MEMS turbine 206 and a MEMS generator 208. The vapor chamber heat sink 202 comprises a hollow vapor chamber base 210 and a plurality of fins or rods 212. The hollow vapor chamber base 210 includes a fluid 214 under pressure within a chamber 216. The vapor chamber heat sink 202 is used to conduct heat 213 away from a heat generating device, such as the integrated circuit package 218 shown mounted to a substrate 220 in FIG. 2.

It will be appreciated that the integrated circuit package 218 can contain any type of integrated circuit that produces heat. However, the present invention is particularly suited for processors used in the mobile environment that operate at high speeds and produce relatively large amounts of heat, such as about 30 watts or more over a temperature of about 100° C. The substrate 220 is any kind of carrier, such as a circuit board, a motherboard or a test board. In this embodiment, a layer of thermal interface material 222 is interposed between the integrated circuit 218 and the vapor chamber heat sink 202. The thickness of the layer of thermal interface material 222 is highly exaggerated for clarification. A thermal interface material is usually a thin layer of material that produces intimate, poreless thermal contact, e.g., typically less than about 0.1 mm in thickness.

In one embodiment, the vapor chamber heat sink embodiments shown herein are comparable to the heat sinks described in U.S. patent application Ser. No. 09/746,554, filed on Dec. 22, 2000, entitled "An Integrated Vapor Chamber Heat Sink and Spreader and an Embedded Direct Heat Pipe Attachment," although there is not necessarily a wick structure in the present invention. In another embodiment, the vapor chamber heat sinks are comparable to the heat sinks described in "U.S. application Ser. No. 09/583,802," supra.

As shown in FIG. 2, the fluid 214 exits the heat sink 202 as a vapor 224. After passing through the compressor 204 the vapor emerges as pressurized vapor 226 that is propelled through the turbine 206 (or a turbine-portion of a turbine generator), producing mechanical energy 228 that is converted to electrical energy 230 in the generator 208. The electrical energy 230 then passes through appropriate electrical infrastructure to provide electricity to a rechargeable battery 232. Excess vapor 234 also exits the turbine 206 and is returned to the heat sink 202 where the process begins again.

Figure 3:
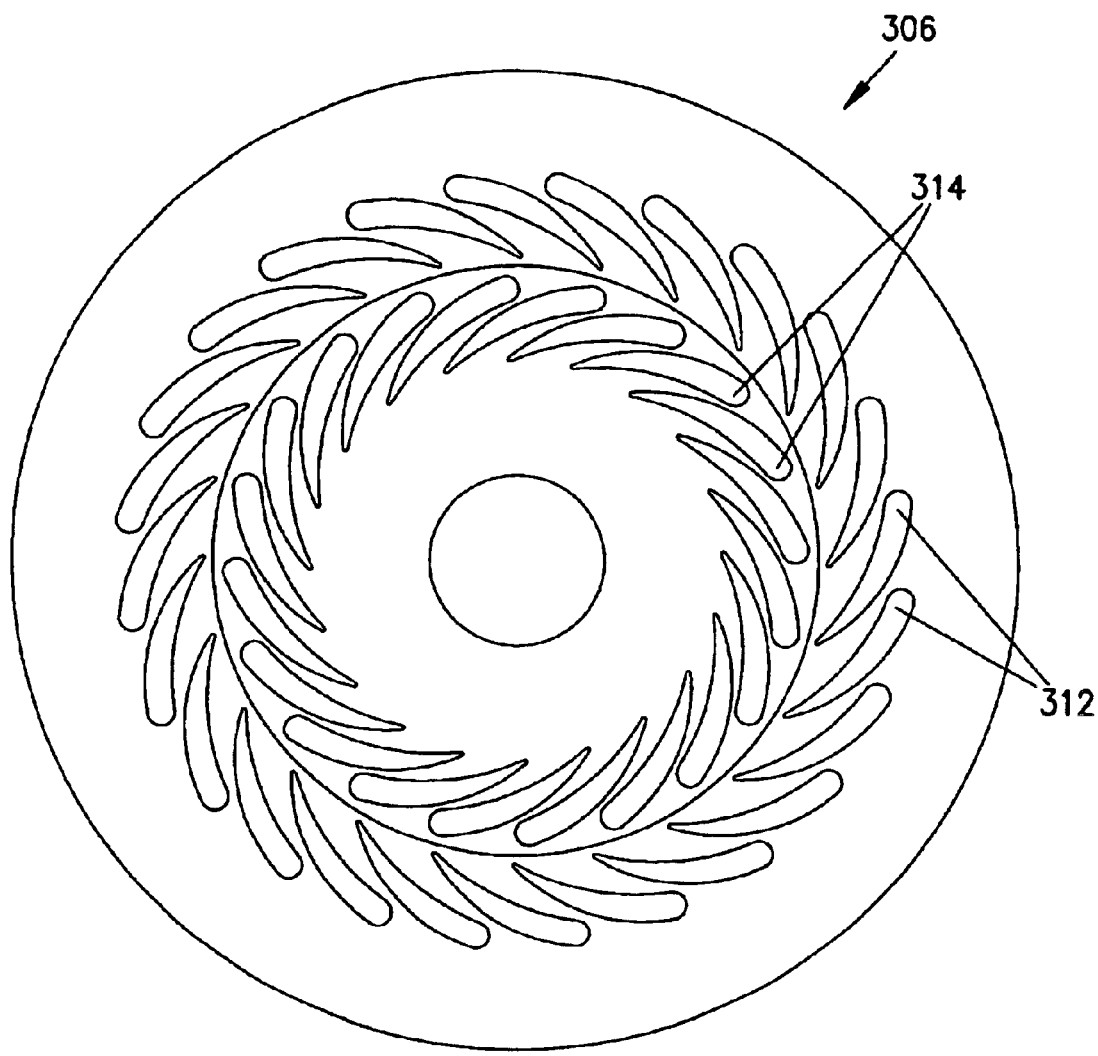
FIG. 3 is a perspective view of a portion of an exemplary turbine in the electrical energy-generating heat sink system of FIG. 2.

FIG. 3 shows one embodiment of a fan blade arrangement in a turbine 306. In this type of turbine, typically referred to as a micro radial inflow turbine, the shape, size, orientation, etc., of the inner row of rotor blades 312 and the outer row of stator blades 314 are designed according to the particular application. Considerations on design include airfoil height, centrifugal bending stress at the blade root, adequate support for radial loads, and so forth.

Figure 4:
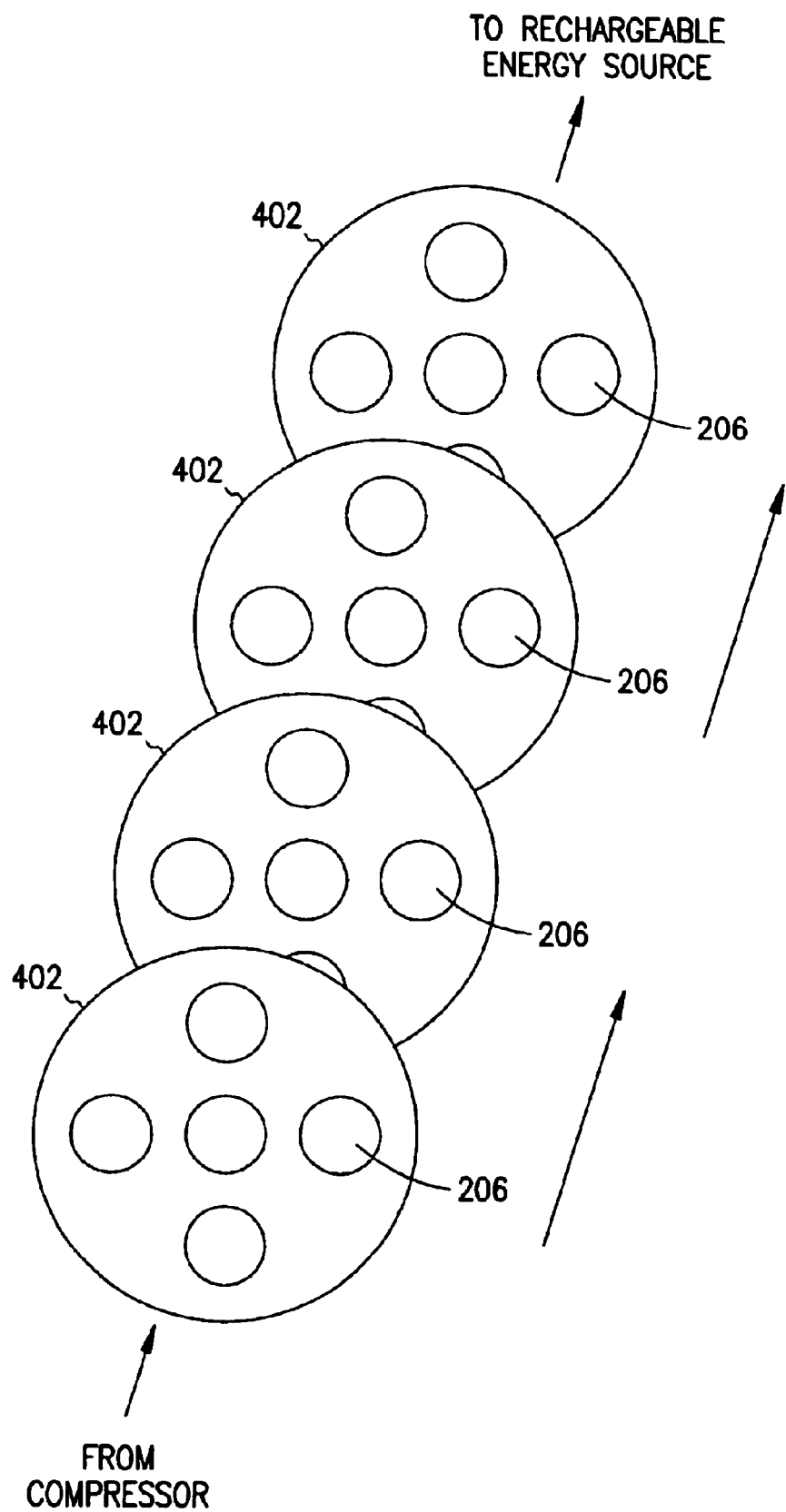
FIG. 4 is a simplified cross-sectional view of an exemplary turbine array in the electrical energy-generating heat sink system of FIG. 2.

FIG. 4 is a simplified illustration of one embodiment of a series of turbine plates 402, each containing five turbines 206, although the invention is not so limited. Any number of turbines 206 can be used as desired for a particular application in order to maximize the generation of electricity. The turbines 206 can be arranged in any manner, e.g., in series or parallel, although greater efficiency may be achieved by using a combination of both serial and parallel. In the embodiment shown in FIG. 4, the turbines 206 are arranged in parallel on each individual plate 402, with four plates 402 arranged in series with the connection exiting the compressor, although any number of turbine plates 402 can be used as desired. If the turbines are arranged only in parallel, this can cause each turbine to operate at a proportionately lower pressure, because the entering pressurized vapor is now split into multiple flow paths. The lower pressure reduces the rate at which the turbine blades spin, thus reducing energy production. Similarly, arranging the turbines in series may also reduce energy production, i.e., each time the vapor passes through a turbine, some "energy" is lost and less work can be done when it passes through the next turbine. The actual design that provides the greatest efficiency can be determined through testing of various combinations, types and numbers of turbines, given the space constraints of a given electronic device.

Figure 5:
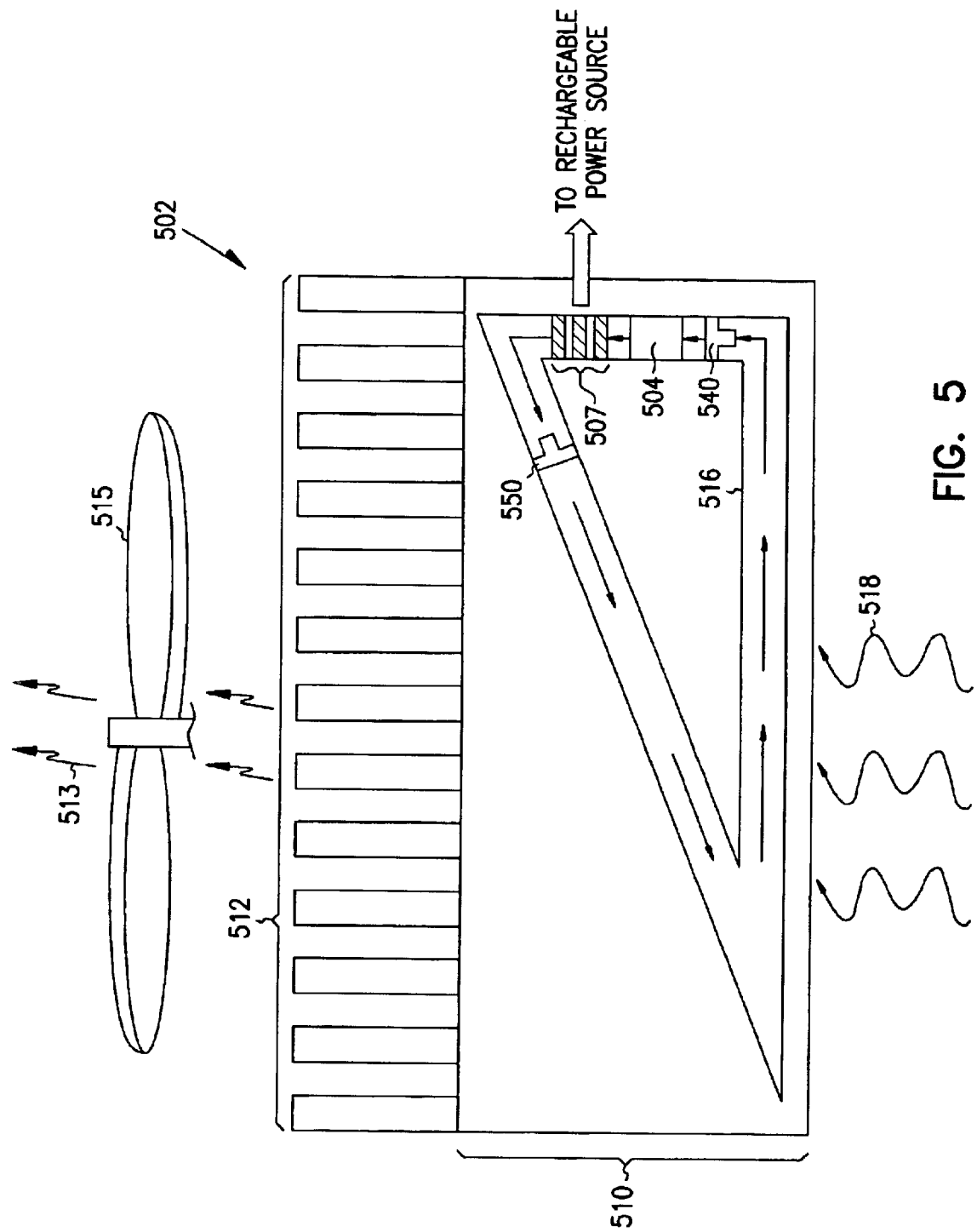
FIG. 5 is an illustration of another embodiment of the electrical energy-generating heat sink system of FIG. 1 in one embodiment of the present invention.

FIG. 5 is a simplified schematic view of an alternative vapor chamber heat sink 502. In this embodiment the vapor chamber heat sink 502 comprises a vapor chamber base 510 and a plurality of fins or rods 512. In the embodiment shown, a fan 515 located above the heat sink 502 assists in removing heat 513, although the invention is not so limited. The hollow vapor chamber base 510 includes a fluid under pressure within a substantially triangular chamber 516. The fluid passes through a compressor 504 and an array of turbine-generators 507 located within the chamber 516. The electrical energy produced is directed to the rechargeable energy storage device. One-way valves 540 and 550 ensure that the flow of fluid is as desired within the chamber 516.

The triangular-shaped chamber 516 shown in FIG. 5 has the advantage of using gravity to return the fluid back to the lower portion of the chamber. In another embodiment, any suitable geometry can be used that provides the requisite incline. In yet another embodiment, the chamber 516 is oriented in any direction and fluid movement is provided and/or assisted by other pumping means, such as with a wick.

Figure 6:
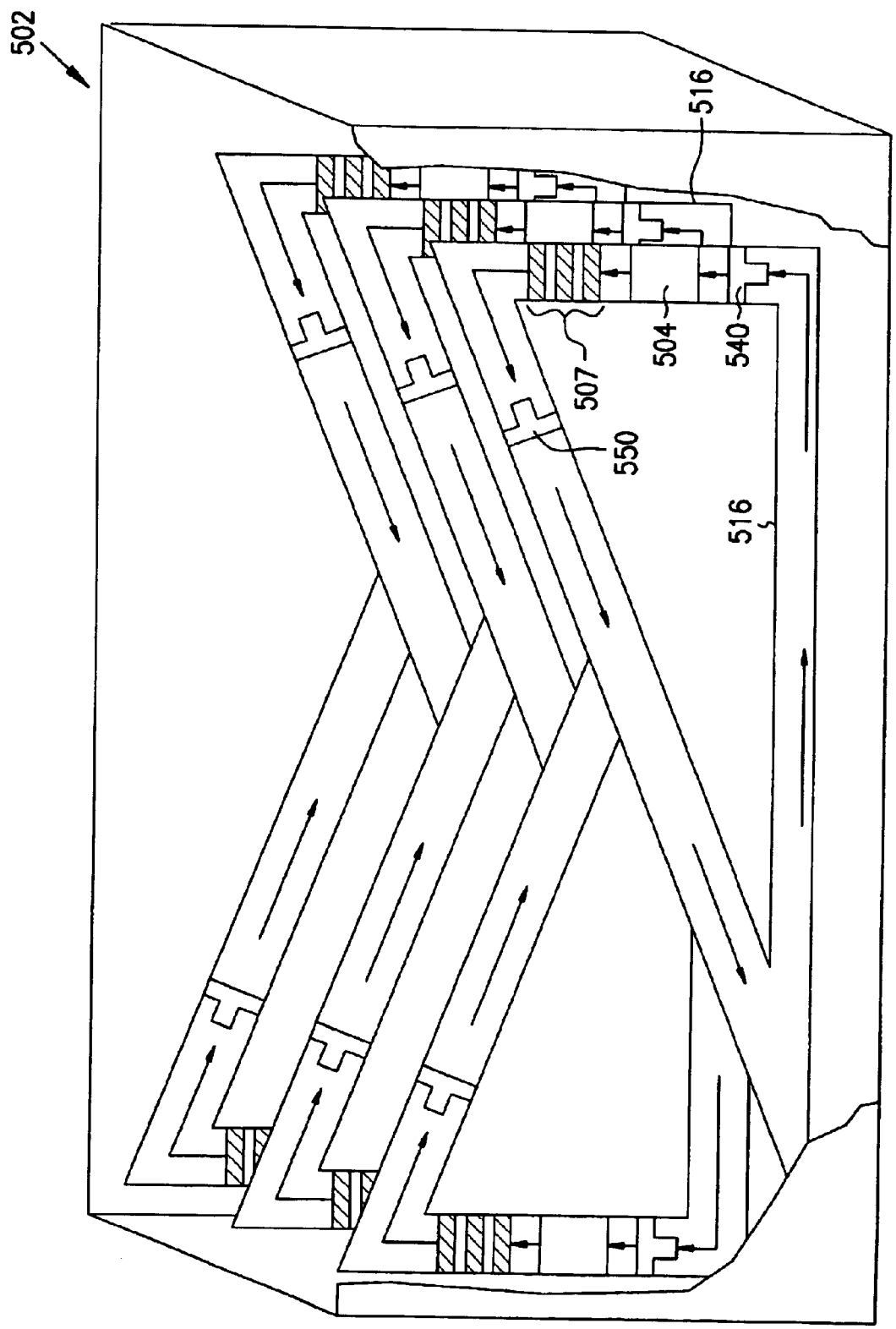
FIG. 6 is a simplified perspective view of the vapor chamber base of FIG. 5 in one embodiment of the present invention.

FIG. 6 is a simplified perspective view of the vapor chamber base 510 of FIG. 5. As can be seen, multiple chambers 516 can be used to increase the efficiency and output of the electrical energy-generating system. The chambers 516 in FIG. 6 alternate in orientation, although the invention is not so limited. Such an arrangement, however, is likely to reduce or eliminate hot spots within the heat sink, as the heat is being directed in alternating directions.

Figure 7:
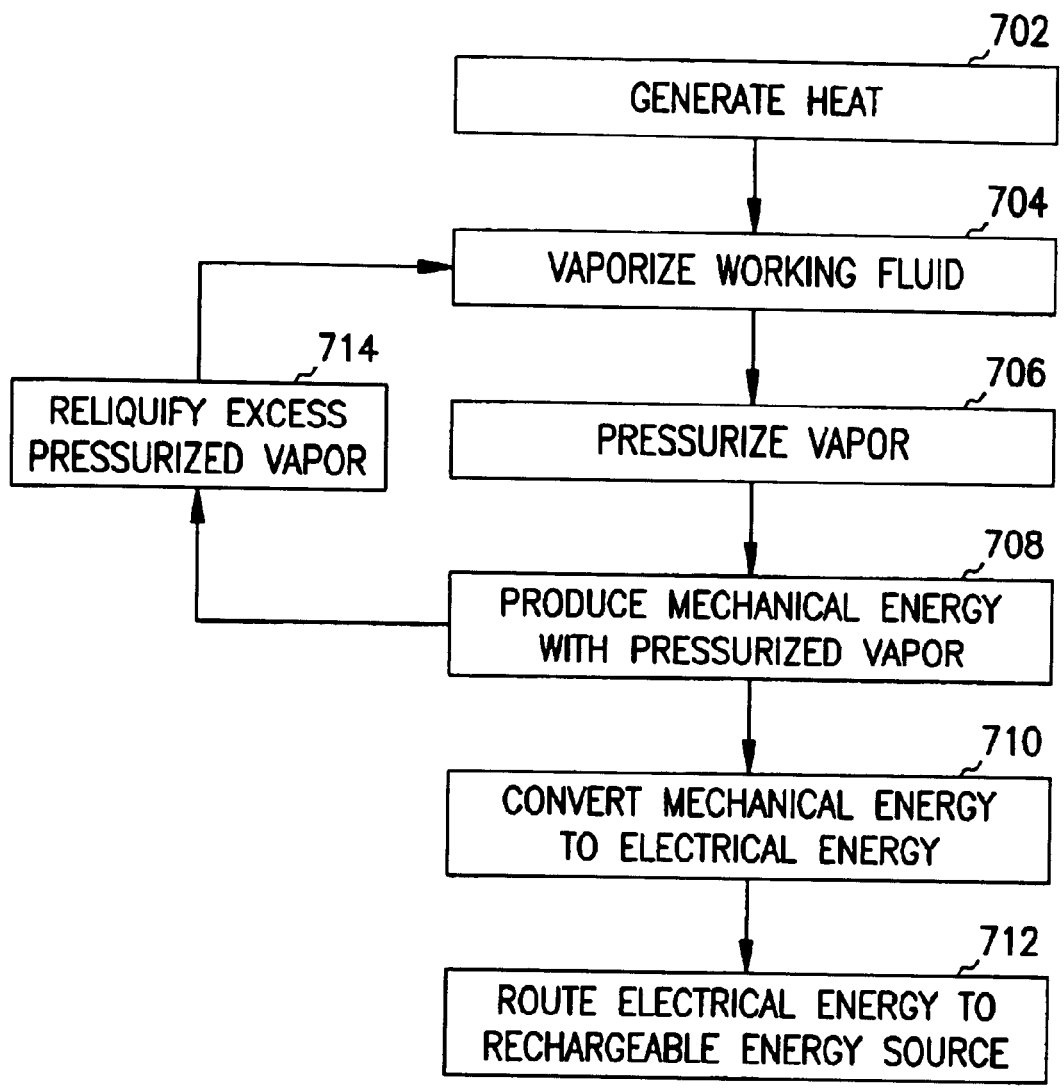
FIG. 7 is a block diagram of a method for providing electrical energy to a rechargeable energy storage device with the system of FIG. 1 in one embodiment of the present invention.

FIG. 7 is a block diagram describing a method for recharging an energy storage device in one embodiment of the present invention. In the initial step heat is generated 702 by a heat generating device. The heat vaporizes 704 a working fluid in thermal contact with the heat generating device. This vapor is then pressurized 706 by a vapor pressurizing device and forced through turbine blades to produce 708 mechanical energy. A generator (or alternator) converts 710 the mechanical energy to electrical energy, which is then routed 712 to the rechargeable energy storage device. Excess vapor from the turbine blades in step 708 is reliquified 714 for use again as a working fluid.

The electrical energy-generating system of the present invention can be designed to efficiently and economically extend the usage of any type of device that generates heat and requires an energy source. This includes, but is not limited to mobile devices such as computers, digital assistants, cell phones, global positioning system receivers, robots, electrical vehicles, cell phones and so forth. However, devices which are run only intermittently, such as cell phones that are cycled on and off, may not benefit fully from the electrical energy-generating features of the present invention, as the necessary heat that fuels the process would only be generated during the short periods while the unit is being operated. In one embodiment, the electrical energy-generating system, in combination with a suitable battery or battery pack, is used as a back-up generator for heat-generating devices routinely connected to the power grid, such as desk-top processors (e.g., in which 50 to 500 watts of power is generated over a temperature of about 100° C.), refrigerators, high-speed modems, and so forth. In another embodiment, the electrical energy-generating system, in combination with a suitable battery system, is utilized as the primary energy source for devices where access to the power grid is impractical and/or not desirable for environmental and/or economic reasons, thus providing mobility for users of devices in remote locations.

It is estimated that as much as five (5) to six (6) Watt-hours of electrical energy can be provided to a rechargeable energy storage device, such as a notebook battery, with the electrical energy-generating system of the present invention, assuming about ten (10) % efficiency. In other embodiments, electrical energy in excess of five (5) to six (6) Watt-hours is provided to the rechargeable electrical source. In yet other embodiments, the efficiency is greater than about ten (10) %.

With regard to notebook computers, it is known that run time varies from computer to computer, based on the applications being used (i.e. high graphics, games), the number of times something is saved or retrieved from the hard drive and/or CD Rom drive, the memory of notebook, the chemistry and capacity of the battery, and so forth. A realistic average run-time for a conventional battery is 1.5 to three (3) hours. The ability of the electrical energy-generating heat sink of the present invention to serve as a battery charger in a notebook computer can likely increase run-time by at least five (5) to ten (10) % or more. In yet other embodiments, run-time may be unlimited, comparable to using a conventional power-grid source.

Figure 8:
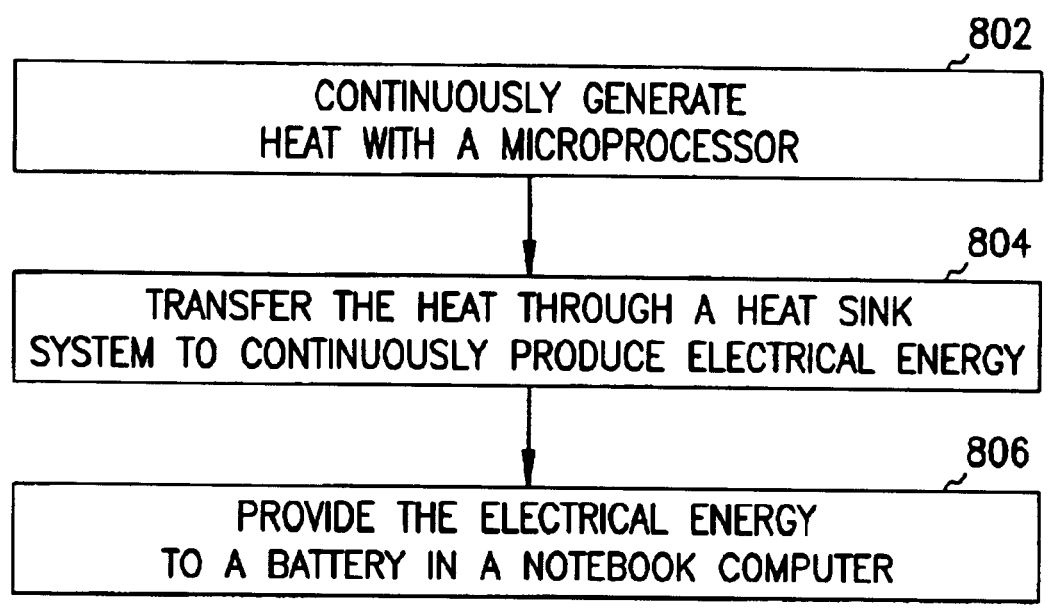
FIG. 8 is a block diagram of a method for extending run-time for a battery-operated notebook computer.

FIG. 8 is a block diagram of a method for extending run-time for a battery-operated notebook computer comprising continuously generating heat 802 with a microprocessor; transferring 804 the heat through a heat sink to continuously produce electrical energy, the heat sink including a compressor and a turbine generator; continuously providing the electrical energy to a battery 806 in the notebook computer to recharge the battery, wherein run-time is extended for the notebook computer.

Batteries used in portable computing equipment typically last between 12 to 18 months, although the life of a battery is more accurately measured in charge/discharge cycles. Nickel metal hydride and lithium iodine batteries typically average about 500+ cycles. It is possible that the in situ continuous recharging device of the present invention may actually extend battery life since the battery is constantly being recharged during use, experiencing fewer cycles. Appropriate tests under suitable conditions can be performed to determine the extent of this possible advantage. The energy efficiency of the rechargeable battery may also be improved with the present invention, i.e., the percentage of electrical energy stored in a rechargeable battery that is recoverable during discharging. However, as noted herein, this percentage is dependent on several factors, including current efficiency, heat losses, and so forth.

It is also possible that the present invention can be modified to assist with the problem of self-discharging that occurs when a battery remains for extended periods in an unused electronic device, i.e., installation of a secondary generator system that functions when the processor is not operating to keep the battery fully charged. Currently, if an electronic device having a rechargeable battery, such as a notebook computer, is left plugged into the power grid, the battery may over-heat, causing the battery cells to slowly deteriorate over time. Use of a MEMS-based generator designed to be operational during non-use can likely be more closely controlled and limited in order to avoid overheating of the battery.

The present invention further reduces or eliminates the overheating problems inherent with batteries in many electronic devices, particularly portable electronic Overheating can lead to failure of other components, causing expensive repairs or even replacement of the entire unit. Furthermore, unlike recharging means that require removal of the batteries for placement in a separate charger, the recharging means of the present invention provides convenient and continuous recharging during use, without the operator needing to take any additional steps. By virtually eliminating reliance on the conventional power grid, the present invention is energy efficient and environmentally-friendly.

Use of a vapor chamber heat sink has the further advantage of alleviating the problem of thermal spreading resistance, which can result in hot spots developing directly over the processor. Vapor chamber heat sinks are generally known to be smaller and lighter than traditional heat sinks. Additionally, the cooling fins are likely to be more efficient because they are all at or near the same temperature.

Although specific embodiments have been illustrated and described herein, it will be appreciated by those of ordinary skill in the art that any arrangement which is calculated to achieve the same purpose may be substituted for the specific embodiment shown. For example, the refrigeration system described herein might be replaced by a suitably-designed magnetic refrigeration system, thus eliminating the need for a fluid-based heat pipe. This application is intended to cover any adaptations or variations of the present invention. Therefore, it is manifestly intended that this invention be limited only by the claims and the equivalents thereof.

What is claimed is:

1. An electrical energy-generating system comprising:
   a heat transfer device containing a working fluid, the heat transfer device responsive to heat generated by a microprocessor;
   a vapor pressurizing device thermally coupled to the heat transfer device; and
   an electricity generating device thennally coupled to a compressor and fluidly coupled to the heat transfer device.

2. The electrical energy-generating system of claim 1 wherein the working fluid is a dielectric.

3. The electrical energy-generating system of claim 2 wherein the dielectric is a hydrofluoroether or chlorofluorocarbon.

4. The electrical energy-generating system of claim 2 wherein the working fluid is selected from the group consisting of deionized water, ammoma, acetone and methanol.

5. The electrical energy-generating system of claim 1 wherein the electricity generating device comprises a turbine generator.

6. The electrical energy-generating system of claim 5 wherein the turbine is mechanically coupled to the generator and fluidly coupled to the compressor.

7. The electrical energy-generating system of claim 6 comprising a plurality of turbines.

8. The electrical energy-generating system of claim 7 wherein the plurality of turbines are arranged in parallel on a turbine plate, further wherein the turbine plate is arranged in series with the compressor.

9. The electrical energy-generating system of claim 2 wherein the electricity generating device comprises a turbine and an alternator, the alternator capable of providing energy to an external AC device.

10. The electrical energy-generating system of claim 9 wherein the turbine is mechanically coupled to the alternator and fluidly coupled to the compressor.

11. The electrical energy-generating system of claim 2 wherein the heat transfer device is a heat pipe or thermosyphon.

12. The electrical energy-generating system of claim 11 wherein the heat transfer device is a vapor chamber heat sink having no wick and a substantially triangular chamber base and a plurality of fins or rods.

13. The electrical energy-generating system of claim 2 wherein electricity generated by the electricity generating device is routed to a rechargeable energy storage device.

14. The electrical energy-generating system of claim 13 wherein the rechargeable energy storage device is a notebook battery.

15. The electrical energy-generating system of claim 1 wherein the compressor and electricity generating device are micro-electrical mechanical systems (MEMS) devices.

16. An electrical energy-generating system comprising:
   a vapor chamber heat sink having a wick structure and containing a working fluid, the heat transfer device responsive to heat generated by a microprocessor;
   a vapor pressurizing device thermally coupled to the heat transfer device; and
   an electricity generating device thermally coupled to a compressor and fluidly coupled to the heat transfer device.

17. The electrical energy-generating system of claim 16 wherein the working fluid is a dielectric.

18. The electrical energy-generating system of claim 17 wherein the dielectric is a hydrofluoroether or chiorofluorocarbon.

19. A device comprising:
   a refrigeration system coupled to a micro-electrical mechanical systems (MEMS) electricity generating device wherein working fluid in the refrigeration system is vaporized in a heat transfer device and channeled through a MEMS compressor to produce pressurized vapor, further wherein the pressurized vapor passes through the MEMS electricity generating device to provide electrical energy to a rechargeable energy storage device.

20. The MEMS device of claim 19 wherein excess vapor is reliquified in the heat transfer device for use again in the system.

21. The MEMS device of claim 20 wherein the MEMS electricity generating device is a turbine generator.

22. The MEMS device of claim 19 wherein the rechargeable energy storage device is a notebook battery.

23. An electrical energy-generating heat sink system comprising:
   a vapor chamber heat sink containing a working fluid;
   a MEMS compressor fluidly coupled to the vapor chamber heat sink; and
   a MEMS turbine generator thermally coupled to the compressor and configured to provide electrical energy to a rechargeable battery in a notebook computer.

24. The electrical energy-generating heat sink system of claim 23 wherein the compressor is driven with a piezoelectric device.

25. The electrical energy-generating heat sink system of claim 23 wherein run-time of the rechargeable battery in the notebook computer is increased by at least ten percent.

26. An integrated circuit package comprising:
   a heat transfer device having an integrated circuit mating surface;
   a MEMS compressor coupled to the heat transfer device; and
   a MEMS electricity generating device coupled to the compressor.

27. The integrated circuit package of claim 26 further comprising a cooling device coupled to the MEMS electricity generating device and to the heat transfer device, the cooling device configured to cool excess vapor from the MEMS electricity generating device for use again in the heat transfer device.

28. The integrated circuit package of claim 27 wherein the cooling device is a thermoelectric cooler or a condenser.

29. The integrated circuit package of claim 28 wherein the condenser is integral with the heat transfer device, further wherein the heat transfer device is a vapor chamber heat sink.

30. The integrated circuit package of claim 29 further comprising a fan thermally coupled to the vapor chamber heat sink.

31. The integrated circuit package of claim 26 further comprising an integrated circuit die thermally coupled to the integrated circuit mating surface of the heat transfer device.

32. A method for providing electrical energy to a rechargeable energy storage device comprising:
   vaporizing a working fluid in thermal contact with an integrated circuit package to produce vapor;
   pressurizing the vaporized fluid to produce pressurized vapor;
   forcing the pressurized vapor through turbine blades to produce mechanical energy;
   converting the mechanical energy to electrical energy; and
   routing the electrical energy to the rechargeable energy storage device.

33. The method of claim 32 further comprising reliquifying excess pressurized vapor.

34. The method of claim 32 wherein the energy storage device is located in an electronic device.

35. The method of claim 34 wherein the electronic device is a notebook computer.

* * * * *

UNITED STATES PATENT AND TRADEMARK OFFICE
CERTIFICATE OF CORRECTION

PATENT NO. : 6,877,318 B2
DATED : April 12, 2005
INVENTOR(S) : Tadayon et al.

It is certified that error appears in the above-identified patent and that said Letters Patent is hereby corrected as shown below:

Column 11,
Line 8, delete "thennally" and insert -- thermally --, therefor.
Line 18, delete "ammoma" and insert -- ammonia --, therefor.
Lines 66-67, delete "chiorofluorocarbon" and insert -- chlorofluorocarbon --, therefor.

Signed and Sealed this

Twenty-third Day of August, 2005

JON W. DUDAS
*Director of the United States Patent and Trademark Office*